(12) United States Patent
Zhao et al.

(10) Patent No.: US 11,063,722 B2
(45) Date of Patent: Jul. 13, 2021

(54) SIGNAL PROCESSING METHOD AND APPARATUS, DEVICE, AND COMPUTER READABLE STORAGE MEDIUM

(71) Applicant: CHINA ACADEMY OF TELECOMMUNICATIONS TECHNOLOGY, Beijing (CN)

(72) Inventors: Zheng Zhao, Beijing (CN); Tie Li, Beijing (CN); Wei Zhong, Beijing (CN); Bin Ren, Beijing (CN); Fangchen Cheng, Beijing (CN); Ren Da, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/633,718

(22) PCT Filed: Jun. 15, 2018

(86) PCT No.: PCT/CN2018/091551
§ 371 (c)(1),
(2) Date: Jan. 24, 2020

(87) PCT Pub. No.: WO2019/019834
PCT Pub. Date: Jan. 31, 2019

(65) Prior Publication Data
US 2020/0204315 A1    Jun. 25, 2020

(30) Foreign Application Priority Data
Jul. 28, 2017    (CN) .......................... 201710632112.2

(51) Int. Cl.
*H04L 5/00*    (2006.01)

(52) U.S. Cl.
CPC .......... *H04L 5/0048* (2013.01); *H04L 5/0007* (2013.01)

(58) Field of Classification Search
CPC ..... H04L 5/005; H04L 5/0007; H04L 5/0048; H04L 27/2613; H04L 27/2666;
(Continued)

(56) References Cited

U.S. PATENT DOCUMENTS

2014/0192786 A1    7/2014  Skov et al.
2016/0028513 A1    1/2016  Werner et al.
(Continued)

FOREIGN PATENT DOCUMENTS

CN    103037514 A    4/2013
CN    104812057 A    7/2015
(Continued)

OTHER PUBLICATIONS

Extended European Search Report dated Jun. 16, 2020 for Application No. EP 18 83 8315.
(Continued)

*Primary Examiner* — Khanh C Tran
(74) *Attorney, Agent, or Firm* — Harness, Dickey & Pierce, P.L.C.

(57) ABSTRACT

A signal processing method and apparatus, a device, and a computer readable storage medium are provided, which relate to the field of communication technology, to reduce collisions of physical broadcast channel (PBCH) demodulation reference signals (DMRSs). The signal processing method provided by embodiments of the present disclosure includes: generating a plurality of candidate PBCH DMRS sequences; acquiring a mapping relationship between PBCH DMRS sequences and resource element (RE) groups; and transmitting the candidate PBCH DMRS sequences by using RE groups corresponding to the candidate PBCH DMRS
(Continued)

sequences according to the mapping relationship. Therefore, the embodiments of the present disclosure may reduce collisions of PBCH DMRSs.

16 Claims, 5 Drawing Sheets

(58) Field of Classification Search
CPC .. H04L 5/001; H04W 56/00; H04W 72/0446; H04W 72/046; H04B 7/0695
See application file for complete search history.

(56) References Cited

U.S. PATENT DOCUMENTS

| | | | |
|---|---|---|---|
| 2017/0064685 A1 | 3/2017 | Rico Alvarino et al. | |
| 2017/0288835 A1 | 10/2017 | Kim et al. | |
| 2018/0262308 A1* | 9/2018 | Si | H04L 5/0048 |
| 2018/0295590 A1 | 10/2018 | Abedini et al. | |
| 2018/0324732 A1* | 11/2018 | Park | H04W 56/0015 |
| 2018/0368084 A1* | 12/2018 | Ko | H04L 5/0051 |
| 2019/0013917 A1* | 1/2019 | Nam | H04J 11/0086 |
| 2019/0058620 A1 | 2/2019 | Liu et al. | |
| 2019/0223163 A1* | 7/2019 | Ko | H04W 56/00 |
| 2019/0357159 A1* | 11/2019 | Pan | H04W 72/046 |
| 2020/0015239 A1* | 1/2020 | Guey | H04L 27/26 |
| 2020/0099500 A1 | 3/2020 | Huang et al. | |
| 2020/0187159 A1* | 6/2020 | Ko | H04L 5/0051 |
| 2020/0204315 A1* | 6/2020 | Zhao | H04L 5/0048 |
| 2020/0213978 A1 | 7/2020 | Iyer et al. | |

FOREIGN PATENT DOCUMENTS

| | | |
|---|---|---|
| CN | 105917610 A | 8/2016 |
| CN | 108989003 A | 12/2018 |
| JP | 2020-517163 A | 6/2020 |
| JP | 2020-519134 A | 6/2020 |
| JP | 2020-523934 A | 8/2020 |
| WO | WO-2016/048074 A1 | 3/2016 |

OTHER PUBLICATIONS

NTT Docomo et al: "Discussion on sequence design of DMRS for NR-PBCH", 3GPP Draft; R1-1711062 Discussion on Sequence Design of DMRS for NRPBCH Final, 3rd Generation Partnership Project (3GPP), Mobile Competence Centre ; 650, Route Des Lucioles ; F-06921 Sophia-Antipolis, vol. RAN WG1, No. Qingdao, P.R. China; Jun. 27, 2017-Jun. 30, 2017 Jun. 26, 2017, XP051300262, Retrieved from the Internet: URL:http://www.3gpp.org/ftp/Meetings_3GPP_Sync/RAN1/Docs/ [retrieved on Jun. 26, 2017].

Sony: "Discussion on SS block time index indication", 3GPP Draft; R1-1711659_Time_Index_Indication, 3rd Generation Partnership Project (3GPP), Mobile Competence Centre ; 650, Route Des Lucioles ; F-06921 Sophia-Antipolis Cedex ; France, vol. RAN WG1, No. Qingdao, P.R. China; Jun. 27, 2017-Jun. 30, 2017 Jun. 27, 2017, XP051305915, Retrieved from the Internet: URL:http://www.3gpp.org/ftp/tsg_ran/WG1_RL1/TSGR1_AH/NR_AH_1706/Docs/ [retrieved on Jun. 27, 2017].

Written Opinion of the International Search Authority dated Sep. 5, 2018 for International Application No. PCT/CN2018/091551.

Chinese Office Action dated Nov. 29, 2019 for Application No. CN 201710632112.2.

3GPP TS 38.211. V0.1.0 (Jun. 2017) "3rd Generation Partnership Project; Technical Specification Group Radio Access Network; NR; Physical channels and modulation (Release 15)".

Korean Office Action dated Apr. 14, 2021 for KR Application No. 10-2020-7004554.

NTT Docomo, Inc., "Discussion on timing indication based on SS block NR", Agenda Item 5.1.1.1.3, 3GPP TSG RAN WG1 NR Ad-Hoc#2, R1-1711058. Qingdao, P.R. China, Jun. 27-30, 2017.

Ericsson, "Summary of email discussion [89-15] Details for NR-PBCH evaluation", Agenda Item 7.1.1.2.1, 3GPP TSG RAN WG1 Meeting #89, R1-1709868, Hangzhou, China, May 15-19, 2017.

Japanese Office Action dated Mar. 11, 2021 for Japanese Patent Application No. 2020-503858.

* cited by examiner

SIGNAL PROCESSING METHOD AND APPARATUS, DEVICE, AND COMPUTER READABLE STORAGE MEDIUM

CROSS-REFERENCE TO RELATED APPLICATIONS

The present application is a U.S. national phase application of a PCT Application No. PCT/CN2018/091551 filed on Jun. 15, 2018, which claims a priority of Chinese Patent Application No. 201710632112.2 filed in China on Jul. 28, 2017, the disclosure of each of which are incorporated in their entirety by reference herein.

TECHNICAL FIELD

Embodiments of the present disclosure relate to the field of communication technology, in particular to a signal processing method and apparatus, a device, and a computer readable storage medium.

BACKGROUND

In a fifth-generation (5G) mobile communication system, in order to increase a coverage area, synchronization signal (SS) blocks are transmitted by means of beam sweeping, that is, different beams pointing in the same direction or different directions are formed at different moments to transmit SS blocks. An SS block includes an SS and a physical broadcast channel (PBCH) part. The PBCH part includes a PBCH and a PBCH demodulation reference signal (DMRS).

A PBCH DMRS is used for channel estimation and indicates an SS block (time) index. There are a plurality of (for example, eight) available DMRS sequences in each cell. Different sequences correspond to different SS block indices respectively. Upon receiving a signal, user equipment (UE) performs a correlation detection between all possible sequences and the received signal or a channel-equalized signal. A possible sequence with the largest correlation value is used as a detected sequence, and a corresponding SS block index is used as a detected SS block index. The SS block index may represent information about a beam.

There are 1008 physical layer cell identities in a 5G mobile communication system. In the design of a PBCH DMRS, both sequences of different cells and sequences of a same cell are designed to be orthogonal to each other, to improve the precision for SS block detection and channel estimation.

In a conventional communication system, when a cell-specific reference signal (CRS) is mapped to resources, a position of a mapped resource is related to a cell identity. Having received a cell identity, UE detects, according to the cell identity, a CRS on all mapped resources. However, there is no beam sweeping mechanism during the resource mapping and transmission process and a CRS does not need to carry beam indication information. Therefore, how to transmit DMRSs to reduce collisions of PBCH DMRSs if a beam sweeping mechanism is implemented is one major problem discussed in the related art.

SUMMARY

In view of the foregoing problem, the present disclosure provides in some embodiments a signal processing method and apparatus, a device, and a computer readable storage medium, to reduce collisions of PBCH DMRSs.

To solve the foregoing technical problem, in a first aspect, the present disclosure provides in some embodiments a signal processing method applied to a network side device. The method includes: generating candidate PBCH DMRS sequences; acquiring a mapping relationship between PBCH DMRS sequences and resource element (RE) groups; and transmitting the candidate PBCH DMRS sequences by using RE groups corresponding to the candidate PBCH DMRS sequences according to the mapping relationship.

In a possible embodiment of the present disclosure, the mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

In a possible embodiment of the present disclosure, the transmitting the candidate PBCH DMRS sequences by using the RE groups corresponding to the candidate PBCH DMRS sequences according to the mapping relationship includes: modulating the candidate PBCH DMRS sequences; mapping the modulated candidate PBCH DMRS sequences to the RE groups according to the mapping relationship; and transmitting the modulated candidate PBCH DMRS sequences by using the RE groups.

In a possible embodiment of the present disclosure, two orthogonal frequency-division multiplexing (OFDM) symbols for a same SS block carry identical candidate PBCH DMRS sequences; or two OFDM symbols for a same SS block carry different candidate PBCH DMRS sequences; or two OFDM symbols for a same SS block jointly carry a same candidate PBCH DMRS sequence.

In a possible embodiment of the present disclosure, an initial value for a generator polynomial generating the candidate PBCH DMRS sequences is determined according to a cell identity and/or an SS block index.

In a second aspect, the present disclosure further provides in some embodiments a signal processing method applied to UE. The method includes: receiving candidate PBCH DMRS sequences; determining RE groups corresponding to the candidate PBCH DMRS sequences according to a mapping relationship between PBCH DMRS sequences and RE groups; performing a detection on the candidate PBCH DMRS sequences corresponding to the RE groups in the RE groups; and determining an SS block index according to a detected candidate PBCH DMRS sequence.

In a possible embodiment of the present disclosure, the mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

In a possible embodiment of the present disclosure, the performing the detection on the candidate PBCH DMRS sequences corresponding to the RE groups in the RE groups includes: grouping candidate PBCH DMRS sequences to obtain candidate PBCH DMRS sequence groups, where a quantity of the candidate PBCH DMRS sequence groups is equal to a quantity of the RE groups; for each RE group, performing correlation detection between a preset PBCH DMRS sequence and candidate PBCH DMRS sequences in a candidate PBCH DMRS sequence group corresponding to the RE group to obtain correlation values corresponding to the RE group; obtaining a largest correlation value from a plurality of correlation values of all the RE groups; and using a candidate PBCH DMRS sequence corresponding to the largest correlation value as the detected candidate PBCH DMRS sequence.

In a third aspect, the present disclosure further provides in some embodiments a signal processing apparatus. The apparatus includes: a generator module, configured to generate candidate PBCH DMRS sequences; an acquisition module, configured to acquire a mapping relationship between PBCH DMRS sequences and RE groups; and a transmission module, configured to transmit the candidate PBCH DMRS sequences by using RE groups corresponding to the candidate PBCH DMRS sequences according to the mapping relationship.

In a possible embodiment of the present disclosure, the mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

In a possible embodiment of the present disclosure, the transmission module includes: a modulation submodule, configured to modulate the candidate PBCH DMRS sequences; a mapping submodule, configured to map the modulated candidate PBCH DMRS sequences to the RE groups according to the mapping relationship; and a transmission submodule, configured to transmit the modulated candidate PBCH DMRS sequences by using the RE groups.

In a possible embodiment of the present disclosure, two OFDM symbols for a same SS block carry identical candidate PBCH DMRS sequences; or two OFDM symbols for a same SS block carry different candidate PBCH DMRS sequences; or two OFDM symbols for a same SS block jointly carry a same candidate PBCH DMRS sequence.

In a possible embodiment of the present disclosure, an initial value for a generator polynomial generating the candidate PBCH DMRS sequences is determined according to a cell identity and/or an SS block index.

In a fourth aspect, the present disclosure further provides in some embodiments a signal processing apparatus. The apparatus includes: a receiving module, configured to receive candidate PBCH DMRS sequences; a first determination module, configured to determine RE groups corresponding to the candidate PBCH DMRS sequences according to a mapping relationship between PBCH DMRS sequences and RE groups; a detection module, configured to perform a detection on the candidate PBCH DMRS sequences corresponding to the RE groups in the RE groups; and a second determination module, configured to determine an SS block index according to a detected candidate PBCH DMRS sequence.

In a possible embodiment of the present disclosure, the mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

In a possible embodiment of the present disclosure, the detection module includes: a grouping submodule, configured to group candidate PBCH DMRS sequences to obtain candidate PBCH DMRS sequence groups, where a quantity of the candidate PBCH DMRS sequence groups is equal to a quantity of RE groups; a detection submodule, configured to: for each RE group, perform correlation detection between a preset PBCH DMRS sequence and candidate PBCH DMRS sequences in a candidate PBCH DMRS sequence group corresponding to the RE group to obtain correlation values corresponding to the RE group; an acquisition submodule, configured to obtain a largest correlation value from a plurality of correlation values of all the RE groups; and a determination submodule, configured to use a candidate PBCH DMRS sequence corresponding to the largest correlation value as the detected candidate PBCH DMRS sequence.

In a fifth aspect, the present disclosure further provides in some embodiments an electronic device. The electronic device includes a storage, a processor, a transceiver, and a computer program stored in the storage and configured to be executed by the processor, where the processor is configured to execute the computer program to implement the steps in the method as described in the first aspect.

In a sixth aspect, the present disclosure further provides in some embodiments an electronic device. The electronic device includes a storage, a processor, a transceiver, and a computer program stored in the storage and configured to be executed by the processor, where the processor is configured to execute the computer program to implement the steps in the method as described in the second aspect.

In a seventh aspect, the present disclosure provides in some embodiments a computer readable storage medium, configured to store a computer program, where the computer program is configured to be executed by a processor, to implement the steps in the method as described in the first aspect.

In an eighth aspect, the present disclosure provides in some embodiments a computer readable storage medium, configured to store a computer program, where the computer program is configured to be executed by a processor, to implement the steps in the method as described in the second aspect.

The foregoing technical solutions provided in the embodiments of the present disclosure have the following beneficial effects: by means of the solutions in the embodiments of the present disclosure, neighboring cells may be planned appropriately, such that beams pointing in a same direction correspond to different SS block (time) indices as much as possible, so as to avoid collisions of PBCH DMRS symbols between cells.

BRIEF DESCRIPTION OF THE DRAWINGS

To describe the technical solutions in the embodiments of the present disclosure or in the related art more clearly, the accompanying drawings required for describing the embodiments are briefly described hereinafter. Apparently, the drawings accompanying the following descriptions show only some embodiments of the present disclosure, and a person of ordinary skill in the art may still derive other drawings from these accompanying drawings without creative efforts.

DETAILED DESCRIPTION

Specific implementations of the present disclosure are further described below in detail with reference to the accompanying drawings and embodiments. The following embodiments are used to describe the present disclosure, and by no means limit the scope of the present disclosure.

Figure 1:
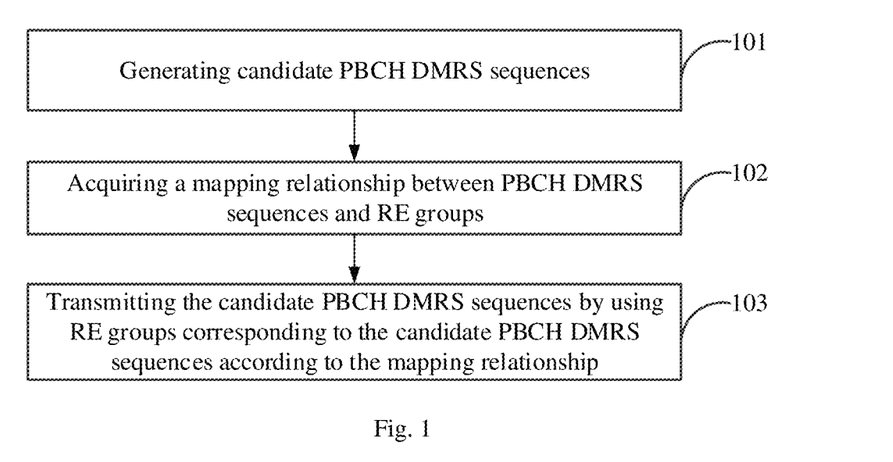
FIG. 1 is a flowchart of a signal processing method according to an embodiment of the present disclosure.

As shown in FIG. 1, a signal processing method according to an embodiment of the present disclosure, which is applied to a network side device, includes the following steps.

A step 101 includes: generating candidate PBCH DMRS sequences.

In this embodiment of the present disclosure, the network side device may be a base station or the like. Usually eight available PBCH DMRS sequences are generated at a base station side. Herein, any one of the eight sequences may be referred to as a candidate PBCH DMRS sequence.

The candidate PBCH DMRS sequences may be generated in various manners. For example, Gold sequences or the like may be generated according to the related art.

A step 102 includes: acquiring a mapping relationship between PBCH DMRS sequences and RE groups.

In this embodiment of the present disclosure, the mapping relationship may be determined according to a prior agreement. For example, the mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

A step 103 includes: transmitting the candidate PBCH DMRS sequences by using RE groups corresponding to the candidate PBCH DMRS sequences according to the mapping relationship.

In this step, the candidate PBCH DMRS sequences are modulated, the modulated candidate PBCH DMRS sequences are mapped to the RE groups according to the mapping relationship, and the modulated candidate PBCH DMRS sequences are transmitted by using the RE groups.

In this embodiment of the present disclosure, a modulation scheme may be binary phase shift keying (BPSK), quadrature phase shift keying (QPSK), 16 quadrature amplitude modulation (16-QAM), 64 quadrature amplitude modulation (64-QAM), 256 quadrature amplitude modulation (256-QAM) or the like.

In practice, two OFDM symbols for a same SS block carry identical candidate PBCH DMRS sequences; or two OFDM symbols for a same SS block carry different candidate PBCH DMRS sequences; or two OFDM symbols for a same SS block jointly carry a same candidate PBCH DMRS sequence.

In practice, there may be over 8000 PBCH DMRS sequences. Choosing which sequence to use is determined by an initial value for a generator polynomial generating the PBCH DMRS sequences. All used sequences have corresponding cell identities and/or SS block indices. The generator polynomial refers to a polynomial used in the generation of PBCH DMRS sequences, for example, a generator polynomial used in the generation of M sequences or a generator polynomial used in the generation of Gold sequences. Therefore, in embodiments of the present disclosure, an initial value for a generator polynomial generating the candidate PBCH DMRS sequences is determined according to a cell identity and/or an SS block index.

As can be seen from above, by means of the solution in this embodiment of the present disclosure, neighboring cells may be planned appropriately, such that beams pointing in a same direction correspond to different SS block (time) indices as much as possible, so as to avoid collisions of PBCH DMRS symbols between cells.

Figure 2:
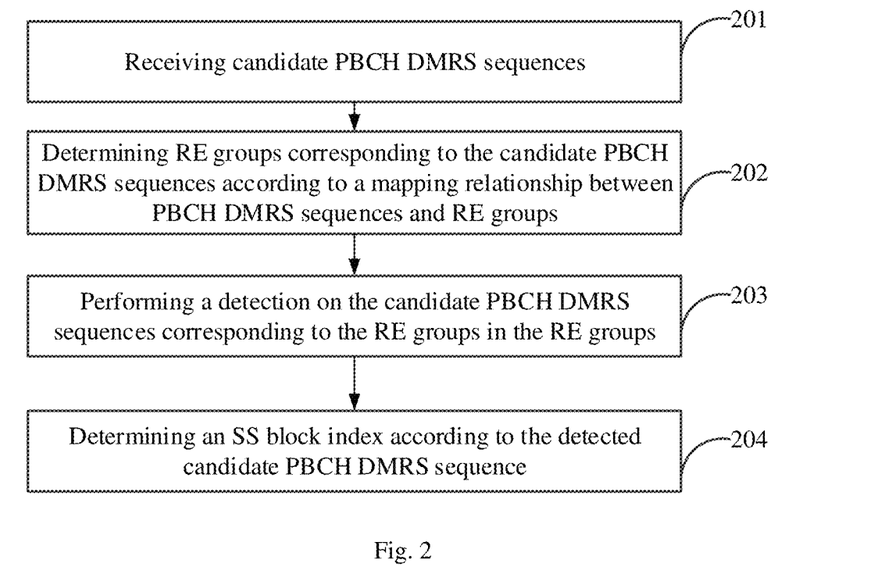
FIG. 2 is a flowchart of a signal processing method according to an embodiment of the present disclosure.

As shown in FIG. 2, a signal processing method according to an embodiment of the present disclosure, which is applied to UE, includes the following steps.

A step 201 includes: receiving candidate PBCH DMRS sequences.

A step 202 includes: determining RE groups corresponding to the candidate PBCH DMRS sequences according to a mapping relationship between PBCH DMRS sequences and RE groups.

As discussed above, the mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

Herein, the UE may acquire the mapping relationship according to a prior agreement with a network side or according to a notification from a network side.

A step 203 includes: performing a detection on the candidate PBCH DMRS sequences corresponding to the RE groups in the RE groups.

Here, candidate PBCH DMRS sequences are grouped to obtain candidate PBCH DMRS sequence groups, where a quantity of the candidate PBCH DMRS sequence groups is equal to a quantity of RE groups. For each RE group, correlation detection is performed between a preset PBCH DMRS sequence and candidate PBCH DMRS sequences in a candidate PBCH DMRS sequence group corresponding to the RE group to obtain correlation values corresponding to the RE group. Subsequently, a largest correlation value is obtained from a plurality of correlation values of all the RE groups, and a candidate PBCH DMRS sequence corresponding to the largest correlation value is used as the detected candidate PBCH DMRS sequence.

For example, it is assumed that there are four RE groups and each cell has eight candidate PBCH DMRS sequences. Here, the eight candidate PBCH DMRS sequences are grouped into four groups. Each group has two PBCH DMRS sequences. During detection, for each RE group, the UE performs correlation detection between two preset PBCH DMRS sequences and candidate PBCH DMRS sequences in each RE group to obtain two correlation values. After performing correlation detection for four RE groups, eight correlation values are obtained. A candidate PBCH DMRS sequence corresponding to the largest correlation value among the eight correlation values is a detected DMRS sequence.

A step 204 includes: determining an SS block index according to the detected candidate PBCH DMRS sequence.

As can be seen from above, by means of the solution in this embodiment of the present disclosure, neighboring cells may be planned appropriately, such that beams pointing in a same direction correspond to different SS block (time) indices as much as possible, so as to avoid collisions of PBCH DMRS symbols between cells.

Implementation processes of signal processing methods according to embodiments of the present disclosure are described in detail with reference to the following embodiments.

Figure 3:
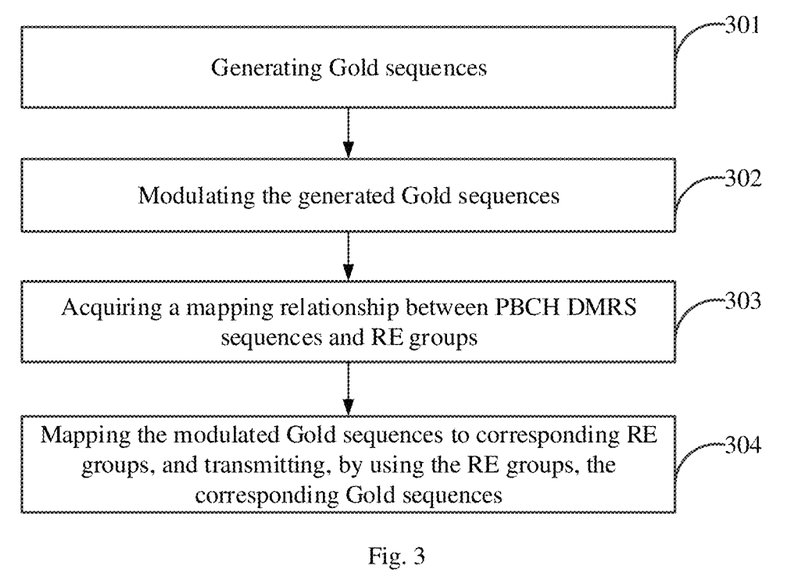
FIG. 3 is a flowchart of a signal processing method according to an embodiment of the present disclosure.

As shown in FIG. 3, taking a base station side for example, a signal processing method according to an embodiment of the present disclosure includes the following steps.

A step 301 includes: generating all candidate PBCH DMRS sequences, where the generated candidate PBCH DMRS sequences are Gold sequences.

In this embodiment of the present disclosure, a generated candidate PBCH DMRS sequence is a Gold sequence. The Gold sequence may be an intact Gold sequence in one period or is a segment of sub-sequence truncated from a Gold sequence in one period. An initial value for a generator polynomial generating the Gold sequences is related to a cell identity and/or a synchronization block (time) index.

A step 302 includes: modulating the generated Gold sequences. In this embodiment of the present disclosure, a modulation scheme may be BPSK, QPSK, 16-QAM, 64-QAM, 256-QAM or the like.

A step 303 includes: acquiring a mapping relationship between PBCH DMRS sequences and RE groups.

In this embodiment of the present disclosure, the mapping relationship between PBCH DMRS sequences and RE groups is a correspondence between modulated Gold sequences and RE groups.

A step 304 includes: mapping the modulated Gold sequences to corresponding RE groups, and transmitting, by using the RE groups, the corresponding Gold sequences.

In practice, for example, two OFDM symbols are used to transmit a PBCH part in one SS block. PBCH DMRSs in the two symbols may carry two identical Gold sequences or may carry two different Gold sequences, or two symbols jointly carry one same Gold sequence.

As can be seen from above, by means of the solution in this embodiment of the present disclosure, neighboring cells may be planned appropriately, such that beams pointing in a same direction correspond to different SS block (time) indices as much as possible, so as to avoid collisions of PBCH DMRS symbols between cells.

In addition, in this embodiment of the present disclosure, candidate PBCH DMRS sequences of each cell are grouped into several groups. Each group of candidate PBCH DMRS sequences are separately transmitted on different RE groups, so that indices of different SS blocks or PBCH DMRS sequences corresponding to different cells are mapped to different RE groups for transmission. In this way, a quantity of candidate sequences to be detected on each RE is reduced, thereby improving detection precision and reducing detection complexity.

Figure 4:
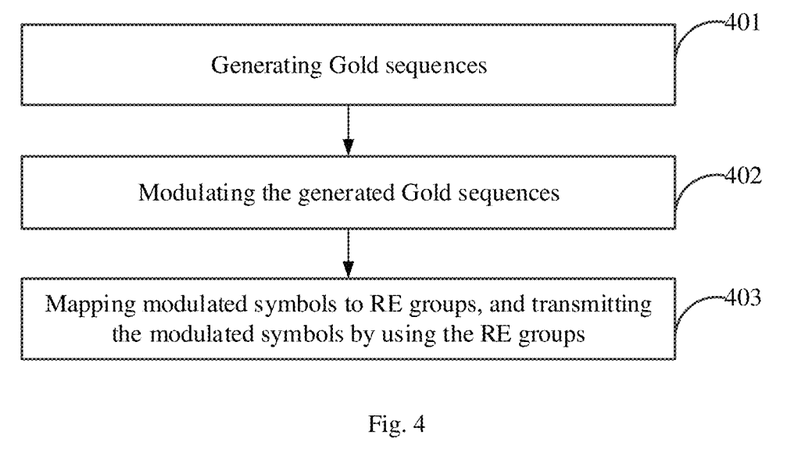
FIG. 4 is a flowchart of a signal processing method according to an embodiment of the present disclosure.

As shown in FIG. 4, taking a base station side for example, a signal processing method according to an embodiment of the present disclosure includes the following steps.

A step 401 includes: generating Gold sequences.

For example, the base station generates Gold sequences c(n) in the following manner, where the length of c(n) is Np, and the value of Np may be, for example, 288.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where an initial value of $x_1$ (n) is: $x_1(0)=1$, $x_1(n)=0$, n=1, ... ,30, and an initial value of $x_2$ (n) is determined by $c_{init}=\Sigma_{i=0}^{30}x_2(i)\cdot 2^i$, where $c_{init}$ and $x_2$ (i) are constants, and Nc is a constant and is a positive integer, for example, may be 1600.

$c_{init}$ is related to an SS block index (SS block index) and a cell identity (NR cell ID), for example: $c_{init}$=1008×SS block index+NR cell ID; or $c_{init}$=SS block index+8×NR cell ID; or $c_{init}$=1024×SS block index+NR cell ID.

A step 402 includes: modulating the generated Gold sequences c(n).

In this embodiment of the present disclosure, a modulation scheme may be QPSK modulation, and d(n) is obtained, (n=0, 1, ... , 143).

A step 403 includes: mapping modulated symbols to RE groups, and transmitting the modulated symbols by using the RE groups.

The first subcarrier of each PBCH symbol is a carrier 0. Starting from the $m^{th}$ subcarrier (m=0, 1, 2, 3), modulated PBCH DMRS sequences are sequentially mapped to m+4k (k=0, 1, ... , 71) subcarriers. m may be determined according to a cell identity and/or an SS block index. For example, m=mod(SS block index, 4), or m=mod(SS block index+mod(N_cellID, 4), 4).

For the first PBCH symbol, d(n) is transmitted on the $(m+4n)^{th}$ subcarrier. That is:

$$a(1,m+4n)=d(n)(n=0,1,\ldots,71).$$

For the second PBCH symbol, d(n+72) is transmitted on the $(m+4n)^{th}$ subcarrier. That is:

$$a(2,m+4n)=d(n+72)(n=0,1,\ldots,71).$$

As can be seen from above, by means of the solution in this embodiment of the present disclosure, neighboring cells may be planned appropriately, such that beams pointing in a same direction correspond to different SS block (time) indices as much as possible, so as to avoid collisions of PBCH DMRS symbols between cells.

Figure 5:
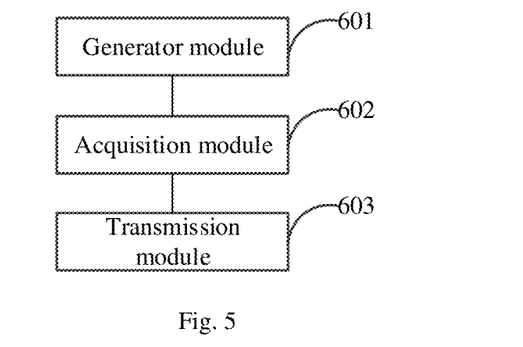
FIG. 5 is a schematic diagram of a signal processing apparatus according to an embodiment of the present disclosure.

As shown in FIG. 5, a signal processing apparatus in an embodiment of the present disclosure includes: a generator module 601, configured to generate candidate PBCH DMRS sequences; an acquisition module 602, configured to acquire a mapping relationship between PBCH DMRS sequences and RE groups; and a transmission module 603, configured to transmit the candidate PBCH DMRS sequences by using RE groups corresponding to the candidate PBCH DMRS sequences according to the mapping relationship.

The mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

Figure 6:
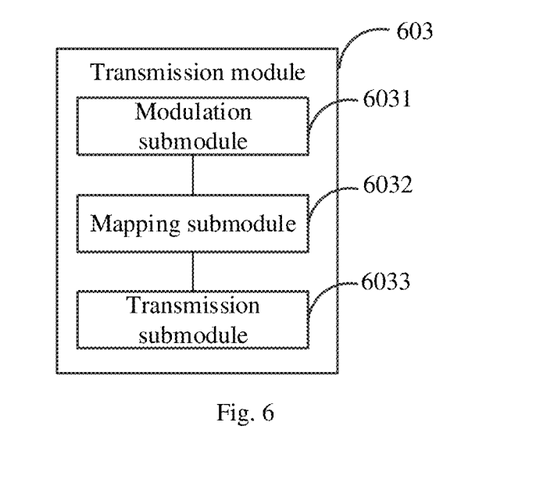
FIG. 6 is a schematic diagram of a transmission module according to an embodiment of the present disclosure.

As shown in FIG. 6, the transmission module 603 includes: a modulation submodule 6031, configured to modulate the candidate PBCH DMRS sequences; a mapping submodule 6032, configured to map the modulated candidate PBCH DMRS sequences to the RE groups according to the mapping relationship; and a transmission submodule 6033, configured to transmit the modulated candidate PBCH DMRS sequences by using the RE groups.

In this embodiment of the present disclosure, two OFDM symbols for a same SS block carry identical candidate PBCH DMRS sequences; or two OFDM symbols for a same SS block carry different candidate PBCH DMRS sequences; or two OFDM symbols for a same SS block jointly carry a same candidate PBCH DMRS sequence.

An initial value for a generator polynomial generating the candidate PBCH DMRS sequences is determined according to a cell identity and/or an SS block index.

For the operating principle of the apparatus, a reference may be made to the foregoing description of the method embodiments.

As can be seen from above, by means of the solution in this embodiment of the present disclosure, neighboring cells may be planned appropriately, such that beams pointing in a same direction correspond to different SS block (time) indices as much as possible, so as to avoid collisions of PBCH DMRS symbols between cells.

Figure 7:
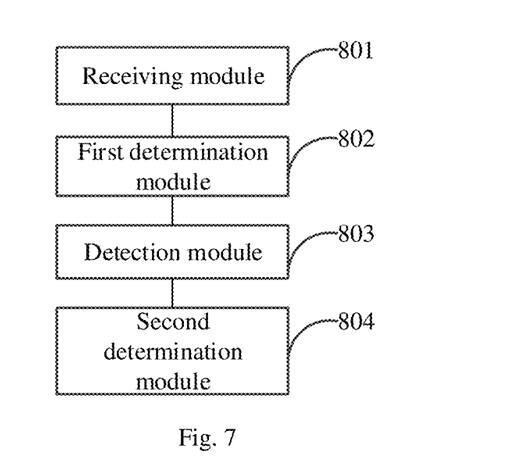
FIG. 7 is a schematic diagram of a signal processing apparatus according to an embodiment of the present disclosure.

As shown in FIG. 7, the present disclosure provides in an embodiment a signal processing apparatus, including: a receiving module 801, configured to receive candidate PBCH DMRS sequences; a first determination module 802, configured to determine RE groups corresponding to the candidate PBCH DMRS sequences according to a mapping relationship between PBCH DMRS sequences and RE groups; a detection module 803, configured to perform a detection on the candidate PBCH DMRS sequences corresponding to the RE groups in the RE groups; and a second determination module 804, configured to determine an SS block index according to a detected candidate PBCH DMRS sequence.

The mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

Figure 8:
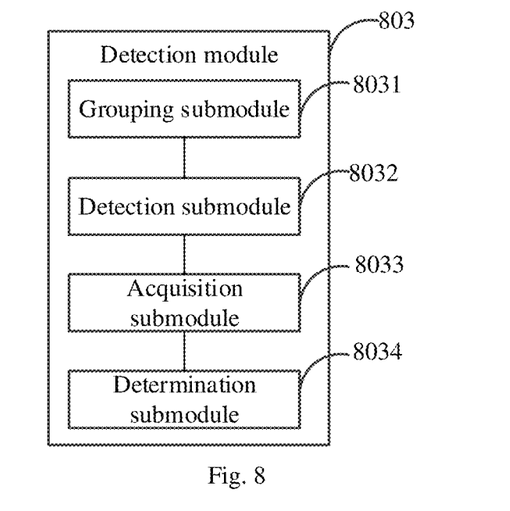
FIG. 8 is a schematic diagram of a detection module according to an embodiment of the present disclosure.

As shown in FIG. 8, the detection module 803 includes: a grouping submodule 8031, configured to group candidate PBCH DMRS sequences to obtain candidate PBCH DMRS sequence groups, where a quantity of the candidate PBCH DMRS sequence groups is equal to a quantity of RE groups; a detection submodule 8032, configured to: for each RE group, perform correlation detection between a preset PBCH DMRS sequence and candidate PBCH DMRS sequences in a candidate PBCH DMRS sequence group corresponding to the RE group to obtain correlation values corresponding to the RE group; an acquisition submodule 8033, configured to obtain the largest correlation value from a plurality of correlation values of all the RE groups; and a determination submodule 8034, configured to use a candidate PBCH DMRS sequence corresponding to the largest correlation value as the detected candidate PBCH DMRS sequence.

For the operating principle of the apparatus, a reference may be made to the foregoing description of the method embodiments.

As can be seen from above, by means of the solution in this embodiment of the present disclosure, neighboring cells may be planned appropriately, such that beams pointing in a same direction correspond to different SS block (time) indices as much as possible, so as to avoid collisions of PBCH DMRS symbols between cells.

Figure 9:
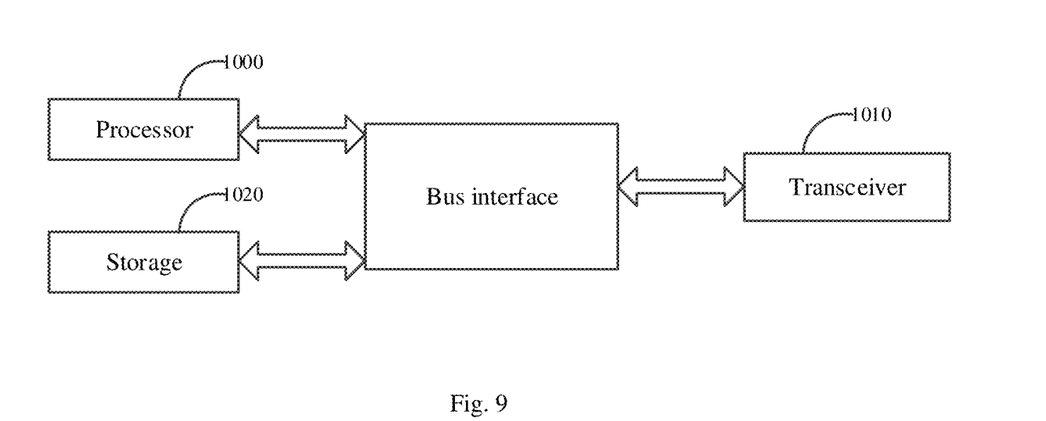
FIG. 9 is a schematic diagram of a network side device according to an embodiment of the present disclosure.

As shown in FIG. 9, the present disclosure provides in an embodiment a network side device, for example, a base station. The network side device includes: a processor 1000, configured to read a program in a storage 1020 to perform the following process: generating candidate PBCH DMRS sequences; acquiring a mapping relationship between PBCH DMRS sequences and RE groups; and transmitting the candidate PBCH DMRS sequences by using RE groups corresponding to the candidate PBCH DMRS sequences according to the mapping relationship; and a transceiver 1010, configured to receive and transmit data under the control of the processor 1000.

In FIG. 9, a bus architecture may include any quantity of interconnected buses and bridges. Specifically, various circuits such as one or more processors represented by the processor 1000 and a storage represented by the storage 1020 are linked together. The bus architecture may also link various other circuits such as peripherals, voltage regulators, and power management circuits, which are well known in the art, and therefore are not further described herein. A bus interface provides an interface. The transceiver 1010 may include a plurality of elements, that is, a transmitter and a transceiver, to provide units for communicating with various other apparatuses over a transmission medium. The processor 1000 is responsible for managing the bus architecture and general processing. The storage 1020 may store data used by the processor 1000 while performing operations.

The processor 1000 is responsible for managing the bus architecture and general processing. The storage 1020 may store data used by the processor 1000 while performing operations.

The mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

The processor 1000 is further configured to read a computer program to perform the following steps: modulating the candidate PBCH DMRS sequences; mapping the modulated candidate PBCH DMRS sequences to the RE groups according to the mapping relationship; and transmitting the modulated candidate PBCH DMRS sequences by using the RE groups.

Two OFDM symbols for a same SS block carry identical candidate PBCH DMRS sequences; or two OFDM symbols for a same SS block carry different candidate PBCH DMRS sequences; or two OFDM symbols for a same SS block jointly carry a same candidate PBCH DMRS sequence.

An initial value for a generator polynomial generating the candidate PBCH DMRS sequences is determined according to a cell identity and/or an SS block index.

Figure 10:
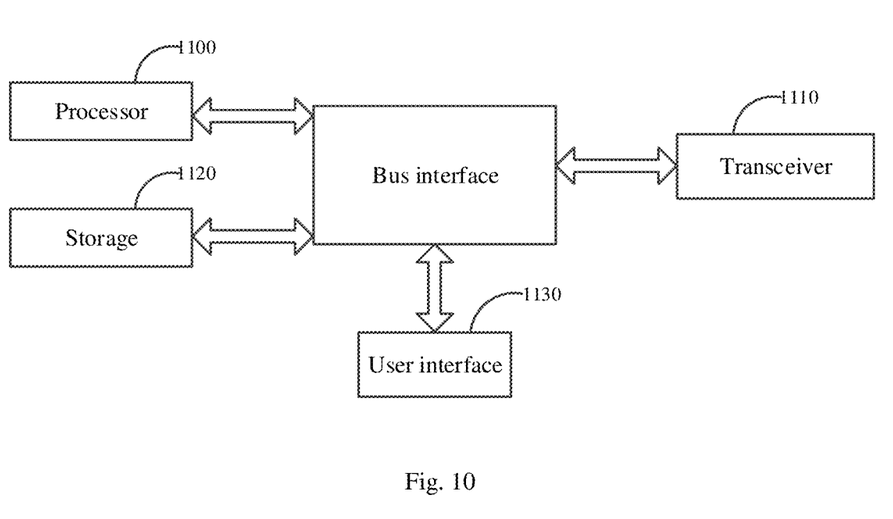
FIG. 10 is a schematic diagram of UE according to an embodiment of the present disclosure.

As shown in FIG. 10, the present disclosure provides in an embodiment UE. The UE includes: a processor 1100, configured to read a program in a storage 1120 to perform the following process: receiving candidate PBCH DMRS sequences by using a transceiver 1110; determining RE groups corresponding to the candidate PBCH DMRS sequences according to a mapping relationship between PBCH DMRS sequences and RE groups; performing a detection on the candidate PBCH DMRS sequences corresponding to the RE groups in the RE groups; and determining an SS block index according to the detected candidate PBCH DMRS sequence; the transceiver 1110, configured to receive and transmit data under the control of the processor 1100.

In FIG. 10, a bus architecture may include any quantity of interconnected buses and bridges. Specifically, various circuits such as one or more processors represented by the processor 1100 and a storage represented by the storage 1120 are linked together. The bus architecture may also link various other circuits such as peripherals, voltage regulators, and power management circuits, which are well known in the art, and therefore are not further described herein. A bus interface provides an interface. The transceiver 1110 may include a plurality of elements, that is, a transmitter and a receiver, to provide units for communicating with various other apparatuses over a transmission medium. For different user equipment, a user interface 1130 may be an interface capable of externally/internally connecting desired devices, including, but not limited to, a keypad, a display, a speaker, a microphone, a joystick and the like.

The processor 1100 is responsible for managing the bus architecture and general processing. The storage 1120 may store data used by the processor 1100 while performing operations.

The mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

The processor 1100 is further configured to read a computer program to perform the following steps: grouping candidate PBCH DMRS sequences to obtain candidate PBCH DMRS sequence groups, where a quantity of the candidate PBCH DMRS sequence groups is equal to a quantity of RE groups; for each RE group, performing correlation detection between a preset PBCH DMRS sequence and candidate PBCH DMRS sequences in a candidate PBCH DMRS sequence group corresponding to the RE group to obtain correlation values corresponding to the RE group; obtaining the largest correlation value from a plurality of correlation values of all the RE groups; and using a candidate PBCH DMRS sequence corresponding to the largest correlation value as the detected candidate PBCH DMRS sequence.

In addition, the present disclosure provides in an embodiment a computer readable storage medium, configured to store a computer program, where the computer program is configured to be executed by a processor to implement the following steps: generating candidate PBCH DMRS sequences; acquiring a mapping relationship between PBCH DMRS sequences and RE groups; and transmitting the candidate PBCH DMRS sequences by using RE groups corresponding to the candidate PBCH DMRS sequences according to the mapping relationship.

The mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

The transmitting the candidate PBCH DMRS sequences by using the RE groups corresponding to the candidate PBCH DMRS sequences according to the mapping relationship includes: modulating the candidate PBCH DMRS sequences; mapping the modulated candidate PBCH DMRS sequences to the RE groups according to the mapping relationship; and transmitting the modulated candidate PBCH DMRS sequences by using the RE groups.

Two OFDM symbols for a same SS block carry identical candidate PBCH DMRS sequences; or two OFDM symbols for a same SS block carry different candidate PBCH DMRS sequences; or two OFDM symbols for a same SS block jointly carry a same candidate PBCH DMRS sequence.

An initial value for a generator polynomial generating the candidate PBCH DMRS sequences is determined according to a cell identity and/or an SS block index.

In addition, the present disclosure provides in an embodiment a computer readable storage medium, configured to store a computer program, where the computer program is configured to be executed by a processor to implement the following steps: receiving candidate PBCH DMRS sequences; determining RE groups corresponding to the candidate PBCH DMRS sequences according to a mapping relationship between PBCH DMRS sequences and RE groups; performing a detection on the candidate PBCH DMRS sequences corresponding to the RE groups in the RE groups; and determining an SS block index according to the detected candidate PBCH DMRS sequence.

The mapping relationship includes: a mapping relationship between candidate PBCH DMRS sequences of different cells and different RE groups; or a mapping relationship between different candidate PBCH DMRS sequences in a same cell and different RE groups; or a mapping relationship between candidate PBCH DMRS sequences of different cell groups and different RE groups; and a mapping relationship between different candidate PBCH DMRS sequences in a same cell and different RE groups.

The performing a detection on the candidate PBCH DMRS sequences corresponding to the RE groups in the RE groups includes: grouping candidate PBCH DMRS sequences to obtain candidate PBCH DMRS sequence groups, where a quantity of the candidate PBCH DMRS sequence groups is equal to a quantity of RE groups; for each RE group, performing correlation detection between a preset PBCH DMRS sequence and candidate PBCH DMRS sequences in a candidate PBCH DMRS sequence group corresponding to the RE group to obtain correlation values corresponding to the RE group; obtaining the largest correlation value from a plurality of correlation values of all the RE groups; and using a candidate PBCH DMRS sequence corresponding to the largest correlation value as the detected candidate PBCH DMRS sequence.

In the several embodiments provided in the present application, it should be understood that the disclosed method and apparatus may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electric, mechanical, or other forms.

In addition, functional units in the embodiments of the present disclosure may be integrated into one processing unit, or each of the units may exist alone physically, or two or more units are integrated into one unit. The integrated unit may be implemented in form of hardware, or may be implemented in form of a combination of hardware and software functional unit.

When the foregoing integrated unit is implemented in form of a software functional unit, the integrated unit may be stored in a computer-readable storage medium. The software functional unit is stored in the storage medium and includes several instructions for instructing a computer device (which may be a personal computer, a server or a network device) to perform some of the steps of the receiving and transmitting method described in the embodiments of the present disclosure. The storage medium includes various media that may store program code, such as a USB flash drive, a removable hard disk, a read-only memory (ROM), a random access memory (RAM), a magnetic disk or an optical disc.

The foregoing describes preferred implementations of the present disclosure. It should be noted that improvements and modifications may be made in the embodiments by a person skilled in the art without departing from the principle of the present disclosure. These improvements and modifications should be construed as falling within the scope of the present disclosure.

What is claimed is:

1. A signal processing method, applied to a network side device, comprising:
    generating candidate physical broadcast channel (PBCH) demodulation reference signal (DMRS) sequences;
    acquiring a mapping relationship between PBCH DMRS sequences and resource element (RE) groups; and
    transmitting the candidate PBCH DMRS sequences by using RE groups corresponding to the candidate PBCH DMRS sequences according to the mapping relationship;
    wherein the mapping relationship includes,
        a mapping relationship between different candidate PBCH DMRS sequences in a same cell and different RE groups, or
        a mapping relationship between candidate PBCH DMRS sequences of different cells and different RE groups; and a mapping relationship between different candidate PBCH DMRS sequences in a same cell and different RE groups.

2. The signal processing method according to claim 1, wherein the transmitting the candidate PBCH DMRS sequences by using the RE groups corresponding to the candidate PBCH DMRS sequences according to the mapping relationship comprises:
    modulating the candidate PBCH DMRS sequences;
    mapping the modulated candidate PBCH DMRS sequences to the RE groups according to the mapping relationship; and
    transmitting the modulated candidate PBCH DMRS sequences by using the RE groups.

3. The signal processing method according to claim 2, wherein
    two orthogonal frequency-division multiplexing (OFDM) symbols for a same synchronization signal (SS) block carry identical candidate PBCH DMRS sequences; or
    two OFDM symbols for a same SS block carry different candidate PBCH DMRS sequences; or
    two OFDM symbols for a same SS block jointly carry a same candidate PBCH DMRS sequence.

4. The signal processing method according to claim 2, wherein an initial value for a generator polynomial generating the candidate PBCH DMRS sequences is determined according to a cell identity and/or an SS block index.

5. The signal processing method according to claim 1, wherein an initial value for a generator polynomial generating the candidate PBCH DMRS sequences is determined according to a cell identity and/or an SS block index.

6. A network side device, comprising a storage, a processor, a transceiver, and a computer program stored in the storage and configured to be executed by the processor, wherein the processor is configured to execute the computer program to implement the steps in the method according to claim 1.

7. The network side device according to claim 6, wherein the processor is configured to execute the computer program to further implement the following steps:
    modulating the candidate PBCH DMRS sequences;
    mapping the modulated candidate PBCH DMRS sequences to the RE groups according to the mapping relationship; and
    transmitting the modulated candidate PBCH DMRS sequences by using the RE groups.

8. The network side device according to claim 7, wherein
    two orthogonal frequency-division multiplexing (OFDM) symbols for a same synchronization signal (SS) block carry identical candidate PBCH DMRS sequences; or
    two OFDM symbols for a same SS block carry different candidate PBCH DMRS sequences; or
    two OFDM symbols for a same SS block jointly carry a same candidate PBCH DMRS sequence.

9. The network side device according to claim 6, wherein an initial value for a generator polynomial generating the candidate PBCH DMRS sequences is determined according to a cell identity and/or an SS block index.

10. A non-transitory computer readable storage medium, configured to store a computer program, wherein the computer program is configured to be executed by a processor, to implement the steps in the method according to claim 1.

11. The signal processing method according to claim 1, wherein an initial value for a generator polynomial generating the candidate PBCH DMRS sequences is determined according to a cell identity and/or an SS block index.

12. A signal processing method, applied to user equipment (UE), comprising:
- receiving candidate physical broadcast channel (PBCH) demodulation reference signal (DMRS) sequences;
- determining resource element (RE) groups corresponding to the candidate PBCH DMRS sequences according to a mapping relationship between PBCH DMRS sequences and RE groups;
- performing a detection on the candidate PBCH DMRS sequences corresponding to the RE groups in the RE groups; and
- determining a synchronization signal (SS) block index according to a detected candidate PBCH DMRS sequence;
- wherein the mapping relationship includes,
  - a mapping relationship between different candidate PBCH DMRS sequences in a same cell and different RE groups, or
  - a mapping relationship between candidate PBCH DMRS sequences of different cells and different RE groups; and a mapping relationship between different candidate PBCH DMRS sequences in a same cell and different RE groups.

13. The signal processing method according to claim 12, wherein the performing the detection on the candidate PBCH DMRS sequences corresponding to the RE groups in the RE groups comprises:
- grouping the candidate PBCH DMRS sequences to obtain candidate PBCH DMRS sequence groups, wherein a quantity of the candidate PBCH DMRS sequence groups is equal to a quantity of the RE groups;
- for each RE group, performing correlation detection between a preset PBCH DMRS sequence and candidate PBCH DMRS sequences in a candidate PBCH DMRS sequence group corresponding to the RE group to obtain correlation values corresponding to the RE group;
- obtaining a largest correlation value from a plurality of correlation values of all the RE groups; and
- using a candidate PBCH DMRS sequence corresponding to the largest correlation value as the detected candidate PBCH DMRS sequence.

14. A non-transitory computer readable storage medium, configured to store a computer program, wherein the computer program is configured to be executed by a processor, to implement the steps in the method according to claim 12.

15. A user equipment (UE) side device, comprising a storage, a processor, a transceiver, and a computer program stored in the storage and configured to be executed by the processor, wherein the processor is configured to execute the computer program to implement a signal processing method and the signal processing method comprises:
- receiving candidate physical broadcast channel (PBCH) demodulation reference signal (DMRS) sequences;
- determining resource element (RE) groups corresponding to the candidate PBCH DMRS sequences according to a mapping relationship between PBCH DMRS sequences and RE groups;
- performing a detection on the candidate PBCH DMRS sequences corresponding to the RE groups in the RE groups; and
- determining a synchronization signal (SS) block index according to a detected candidate PBCH DMRS sequence;
- wherein the mapping relationship includes,
  - a mapping relationship between different candidate PBCH DMRS sequences in a same cell and different RE groups, or
  - a mapping relationship between candidate PBCH DMRS sequences of different cells and different RE groups; and a mapping relationship between different candidate PBCH DMRS sequences in a same cell and different RE groups.

16. The UE side device according to claim 15, wherein the processor is configured to execute the computer program to further implement the following steps:
- grouping the candidate PBCH DMRS sequences to obtain candidate PBCH DMRS sequence groups, wherein a quantity of the candidate PBCH DMRS sequence groups is equal to a quantity of the RE groups;
- for each RE group, performing correlation detection between a preset PBCH DMRS sequence and candidate PBCH DMRS sequences in a candidate PBCH DMRS sequence group corresponding to the RE group to obtain correlation values corresponding to the RE group;
- obtaining a largest correlation value from a plurality of correlation values of all the RE groups; and
- using a candidate PBCH DMRS sequence corresponding to the largest correlation value as the detected candidate PBCH DMRS sequence.

* * * * *